(12) United States Patent
Struschka

(10) Patent No.: US 7,966,813 B2
(45) Date of Patent: Jun. 28, 2011

(54) SEALING ELEMENT FOR A BRAKE CYLINDER OF A VEHICLE BRAKING SYSTEM

(75) Inventor: Martin Struschka, Lahnstein (DE)

(73) Assignee: Lucas Automotive GmbH (DE)

( * ) Notice: Subject to any disclaimer, the term of this patent is extended or adjusted under 35 U.S.C. 154(b) by 254 days.

(21) Appl. No.: 11/895,358

(22) Filed: Aug. 24, 2007

(65) Prior Publication Data

US 2008/0053305 A1 Mar. 6, 2008

(30) Foreign Application Priority Data

Aug. 30, 2006 (DE) .......................... 10 2006 040 487

(51) Int. Cl.
*B60T 11/236* (2006.01)
(52) U.S. Cl. .......................................... 60/588; 277/437
(58) Field of Classification Search .................... 60/562, 60/588; 92/168; 277/437, 438
See application file for complete search history.

(56) References Cited

U.S. PATENT DOCUMENTS

| | | | |
|---|---|---|---|
| 6,007,106 A * | 12/1999 | Wilkins | 285/110 |
| 6,290,235 B1 * | 9/2001 | Albertson | 277/510 |
| 7,104,059 B2 | 9/2006 | Tsubouchi et al. | |
| 2006/0219507 A1 | 10/2006 | Drott et al. | |

FOREIGN PATENT DOCUMENTS

| | | |
|---|---|---|
| DE | 196 15 157 A1 | 10/1997 |
| DE | 10 2004 057 253 A1 | 7/2005 |
| JP | 2003-261020 * | 9/2003 |
| WO | WO 2005/019007 A1 | 3/2005 |

* cited by examiner

*Primary Examiner* — F. Daniel Lopez
(74) *Attorney, Agent, or Firm* — MacMillan, Sobanski, Todd, LLC

(57) ABSTRACT

A sealing element seals a pressure piston which is movably arranged in a housing of a brake cylinder. The sealing element may be inserted into a ring-shaped groove which is provided in the housing. The sealing element includes an outer sealing lip for contact with a floor of the ring-shaped groove, an inner sealing lip for contact with the pressure piston, and a sealing element back. At least one non-sealing spacer element is provided on the sealing element back.

20 Claims, 3 Drawing Sheets

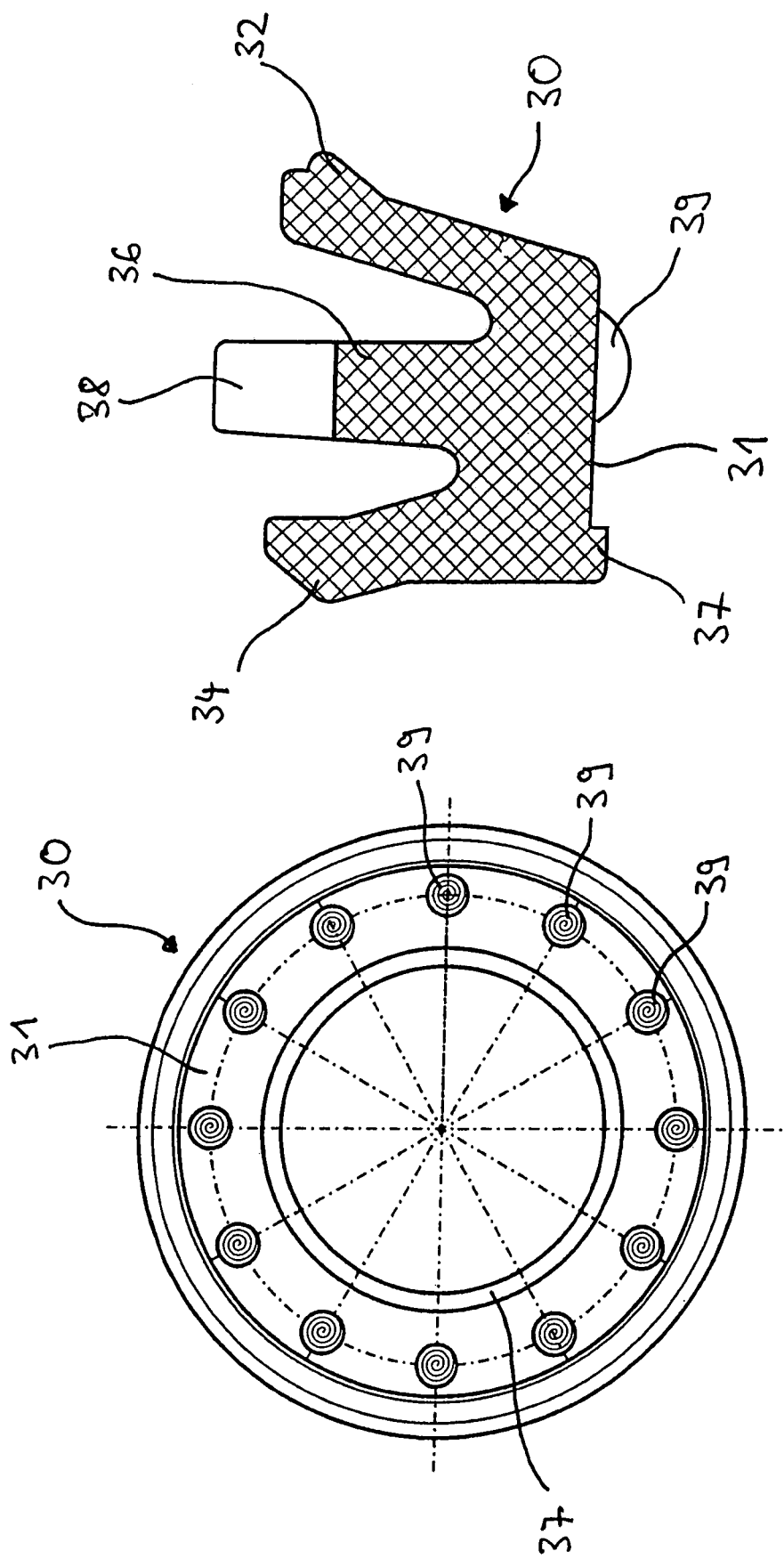

US 7,966,813 B2

SEALING ELEMENT FOR A BRAKE CYLINDER OF A VEHICLE BRAKING SYSTEM

CROSS-REFERENCE TO RELATED APPLICATIONS

This application claims priority to German Patent Application No. 10 2006 040 487.4 filed Aug. 30, 2006, the disclosures of which are incorporated herein by reference.

BACKGROUND OF THE INVENTION

This invention concerns a sealing element for sealing a pressure piston which is movably arranged in a housing of a brake cylinder, it being possible to insert said sealing element into a ring-shaped groove which is provided in the housing. The sealing element includes an outer sealing lip for contact with a floor of the ring-shaped groove, an inner sealing lip for contact with the pressure piston, and a sealing element back. The invention also concerns a brake cylinder, in particular for hydraulic motor vehicle braking systems, into which such a sealing element for sealing a movably arranged pressure piston is inserted.

A sealing element and a brake cylinder of the above-mentioned type are described in, for instance, WO 2005/019007, and corresponding US Publication No. US 2006/0219507 A1, both of which are incorporated by reference herein. When the pressure piston is moved, and consequently hydraulic pressure is built up in the pressure chamber of the brake cylinder, the back section of the sealing element is pressed onto the side wall of the ring-shaped groove into which the sealing element is inserted. In this way, in addition to the dynamic sealing of the movably arranged pressure piston by the inner sealing lip and the sealing of the ring-shaped groove by the outer sealing lip, an additional, at least temporarily permanent sealing area is created. This area, which fulfils a sealing function between the sealing element back and the groove wall, at least temporarily prevents, in the case of the return movement of the pressure piston when the brake is released, fluid flowing out of the fluid reservoir through the groove into the pressure chamber (so-called overflow), to generate the necessary pressure balance between the pressure chamber and the fluid reservoir. Fluid cannot flow through the overrun holes, which are provided in the pressure piston, into the pressure chamber of the brake cylinder until the overrun holes are no longer sealed by the inner sealing lip of the sealing element.

If the brake is abruptly released by rapidly taking the brake pedal back, the temporary result, because of the rapid return movement of the pressure piston, can be a rapid pressure drop inside the pressure chamber of the brake cylinder, since between the sealing element back and the wall of the groove a sealing area remains, and prevents an overflow of the sealing element for the necessary pressure balance. In this case, the result can be a clear low pressure in the pressure chamber compared with the atmospheric pressure in the unpressurised fluid reservoir. This pressure difference between the pressure chamber and the fluid reservoir is balanced as soon as fluid can flow out of the fluid reservoir through the overrun holes, which are provided in the pressure piston, into the pressure chamber of the brake cylinder. Because this pressure balancing occurs very rapidly, flow noises can occur, and be audible in the passenger compartment. This pressure balancing can also be accompanied by cavitation effects, which can result in increased wear or damage.

From DE 10 2004 057 253 A1, and corresponding U.S. Pat. No. 7,104,059, both of which are incorporated by reference herein, a sealing collar for sealing a pressure piston which is arranged in a main cylinder of a vehicle braking system is known. The sealing collar back has continuous projections or grooves, to prevent the sealing collar sticking to the wall of the groove when the pressure piston is rapidly reset.

Another sealing element in ring-shaped form is described in the published version of the German patent application DE 196 15 157 A1. The ring-shaped sealing element is intended for a central valve of a main cylinder of a hydraulic braking system, and has a first part of an elastomer material and a second part of a rigid material. The elastomer first part includes dome-shaped elevations, which are each provided precisely over pin-shaped continuations of the rigid second part, and run in an axial direction. The purpose of the dome-shaped elevations, in the case of a drive slip regulation cycle, is to open the central valve even against a high overpressure, reliably and conforming to a precisely defined opening instant in relation to the position of the piston.

The invention is therefore based on the object of providing an improved sealing element for a brake cylinder of a motor vehicle braking system, said sealing element avoiding the flow noises which occur when the brake is rapidly released because of the rapid pressure balancing between the pressure chamber and the fluid reservoir, and continuing to ensure sufficient sealing between housing groove and pressure piston if the sealing function of the outer sealing lip fails.

BRIEF SUMMARY OF THE INVENTION

According to a first aspect of the invention, a sealing element for sealing a pressure piston which is movably arranged in a housing of a brake cylinder is provided, it being possible to insert said sealing element into a ring-shaped groove which is provided in the housing. The sealing element has an outer sealing lip for contact with a floor of the ring-shaped groove, an inner sealing lip for contact with the pressure piston, and a sealing element back, on which at least one non-sealing spacer element is provided. According to the invention, the object is achieved in that on the sealing element back a sealing ring is provided, and is arranged radially within the spacer element, which projects beyond the sealing ring in the axial direction.

It may be desirable that the temporarily permanent sealing area described above, which is between the sealing element back and the groove wall, and which occurs because the sealing element back is sucked onto the groove wall because of the pressure build up in the pressure chamber, is avoided by the spacer element, so that an overflow of the sealing element is already possible at an instant at which the overrun holes of the pressure piston are still sealed by the inner sealing lip of the sealing element. Overflowing of the sealing element with pressurising medium is thus made possible at a very early stage of the return movement of the pressure piston, since the spacer element according to the invention is non-sealing, and the pressure balancing, compared with the situation of a sealing element without a non-sealing spacer element, takes place at an earlier instant. In this way, the flow noises because of the pressure balancing, which otherwise occurs very rapidly, are at least reduced or avoided.

According to one aspect of the invention, a sealing ring is arranged on the sealing element back. This sealing ring projects in the axial direction from the sealing element back, and represents a redundancy to the sealing surface of the outer sealing lip. This redundancy is particularly important if, because of damage or dirt particles in the pressurising medium, the outer sealing lip may no longer ensure a sufficient seal. In such a case, first the spacer element is brought into contact with the wall of the ring-shaped groove. If the pressure is further increased, the spring-elastic spacer element is compressed. Finally, the sealing ring which is provided on the sealing element back is brought into contact with the wall of the ring-shaped groove, so that the ring-shaped groove is sealed. In this case, the energy which is stored in the spacer element during the elastic deformation, when it is less than the pressure acting on the sealing ring, ensures that the sealing ring can again release itself from the wall of the ring-shaped groove, to again produce a passage for the pressurising medium along the sealing element back. The sealing ring is arranged radially within the spacer element.

In an advantageous further development of the invention, the spacer element is in raised form on the sealing element back. However, it has also been considered that the sealing element back can have groove-shaped recesses which run through it in the radial direction, and through which pressurising medium can flow, to make overflow of the sealing element possible even if the spacer element is in contact with the groove wall.

In one version of the invention, the spacer element is formed in one piece with the sealing element. In this way, the sealing element and the spacer element, which is provided on the sealing element back, can be produced in one production process, e.g. by an injection moulding process. Thus the production of such sealing elements is significantly simplified and the production costs are reduced.

The spacer element may be in spring-elastic form.

According to an advantageous further development of the invention, multiple spacer elements are arranged at equal angular intervals from each other on the sealing element back. Because the spacer elements are arranged at equal angular intervals from each other, the sealing element can be evenly overflowed in the region of the outer sealing lip. Thus the quantity of pressurising medium which is required for pressure balancing distributes itself evenly over the whole perimeter of the outer sealing lip. The flow speed of the pressurising medium is thus reduced because of the enlarged flow cross-section, which in turn reduces the flow noises during pressure balancing.

A specially simple version of the sealing element is achieved in that the multiple spacer elements are arranged in a circle on the sealing element back.

Preferably, between the outer sealing lip and the inner sealing lip, a bearing ring, which contributes to the robustness of the sealing element, is arranged. The bearing ring can either be in the form of a separate component or integral with the sealing element. In the case of the form as a separate component, the bearing ring has higher strength than the material of which the inner sealing lip and outer sealing lip of the sealing element are made.

According to another embodiment of the invention, the bearing ring projects beyond the outer sealing lip and inner sealing lip in the axial direction. This ensures that no movement of the whole sealing element in the axial direction because of a pressure difference between the pressurising medium reservoir and the pressure chamber takes place, so that an unwanted contact of the statically stressed outer sealing lip and dynamically stressed inner sealing lip on the wall of the ring-shaped groove can be prevented.

Preferably, at least one breach is provided on the free axial end of the bearing ring.

A second aspect of the invention concerns a brake cylinder, particularly for hydraulic motor vehicle braking systems, which includes at least a pressure piston which is movably arranged in a housing of the brake cylinder and a sealing element which is provided in a ring-shaped groove of the housing. The sealing element has an outer sealing lip for contact with a floor of the ring-shaped groove, an inner sealing lip for contact with the pressure piston, and a sealing element back, on which at least one non-sealing spacer element is provided. According to the invention, on the sealing element back a sealing ring is provided, and is arranged radially within the spacer element, which projects beyond the sealing ring in the axial direction.

Regarding the suppression of the flow noises which occur in the case of a traditional brake cylinder because of the rapid pressure balancing between the pressure chamber and the pressurising medium reservoir, it may be desirable that on the sealing element back of the sealing element a non-sealing spacer element is provided, e.g. in the form of spring-elastic rubber segments. These spring-elastic rubber segments then take over the function of non-sealing spacer elements, and already make possible an overflow of the outer sealing lip during the return movement of the pressure piston, at an instant at which the overrun holes which are provided in the pressure piston are still sealed by the inner sealing lip.

Other advantages of this invention will become apparent to those skilled in the art from the following detailed description of the preferred embodiments, when read in light of the accompanying drawings.

BRIEF DESCRIPTION OF THE DRAWINGS

FIG. 3 shows a plan view of the sealing element back of the sealing element shown in FIGS. 1 and 2;

FIG. 4 shows an axial section through the sealing element shown in FIGS. 1 and 2.

DETAILED DESCRIPTION OF THE INVENTION

Figure 1:
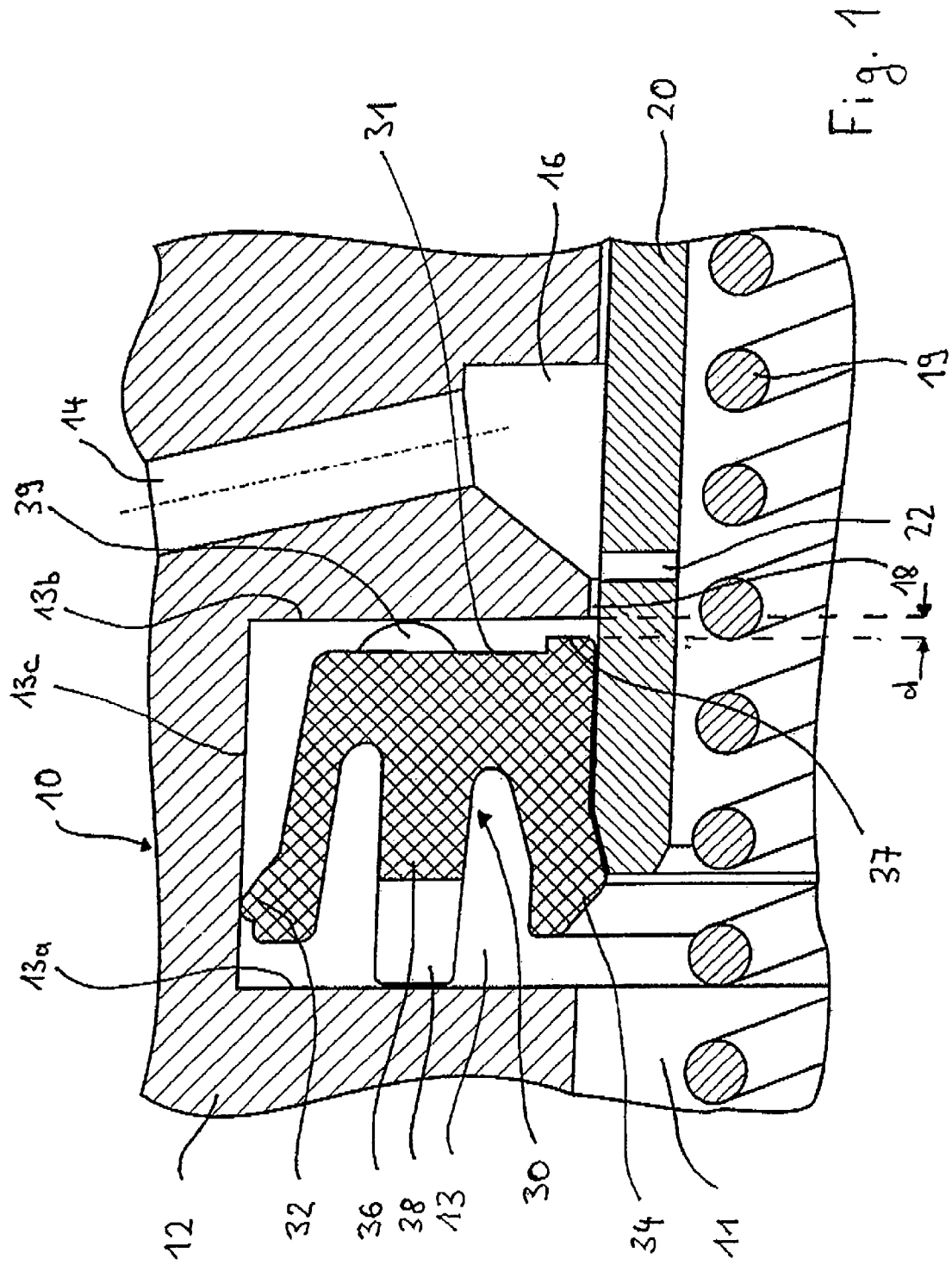
FIG. 1 shows an axial section through a brake cylinder, in which a sealing element according to the invention is housed in a ring-shaped groove of the brake cylinder housing, in the equilibrium state.

FIG. 1 shows, in axial section, a brake cylinder, which for instance can be in plunger or tandem form as a main brake cylinder 10 for hydraulic motor vehicle braking systems. In the case of a tandem main brake cylinder, the two pressure circuits, which are arranged one behind the other, are almost identical regarding their construction and functioning. The following description is therefore restricted to only one pressure circuit. Below, only those features of the main brake cylinder 10 which are relevant with respect to the invention are described, since the functioning of such main brake cylinders is known to the person skilled in the art.

FIG. 1 shows, in axial section, a main brake cylinder 10, which has a housing 12 in cylindrical form, in which a pressure piston 20 is arranged so that it can move. A force is applied to the pressure piston 20 by a brake pedal, with a brake booster (not shown) connected between them. If the main brake cylinder 10 is in tandem construction, the movement of the pressure piston 20 is transmitted through the hydraulic column to a second pressure circuit (not shown).

The housing 12 has a pressurising medium channel 14, which is connected to a pressurising medium reservoir (not shown). From the pressurising medium channel 14, the pressurising medium reaches an intermediate space 16, and from there reaches a pressure chamber 11 through overrun holes 22, which are provided in the pressure piston 20.

A sealing collar (sealing element) 30 is housed in a ring-shaped groove 13 of the housing 12. The ring-shaped groove 13 has two groove walls 13a, 13b and a groove floor 13c. Between the groove wall 13b and the intermediate space 16, a passage 18 through which the pressurising medium can flow into the groove 13 is provided.

With reference to FIG. 4, the sealing collar 30 includes an outer sealing lip 32 with a sealing lip swelling which is provided on its radially outer side and is arranged in direct proximity to the free axial end of the outer sealing lip. This sealing lip swelling is brought into contact with the groove floor 13c by the prevailing pressure in the pressure chamber 11, and thus seals the pressure chamber 11 against the groove 13.

The sealing collar 30 also includes an inner sealing lip 34, which is brought into contact with the pressure piston 20, which is arranged in the housing 12 of the main brake cylinder 10, and thus seals the pressure chamber 11 against the pressure piston 20.

The sealing collar 30 also has an axial projection, which is shown in the section view and called the bearing ring 36. On the free axial end of the bearing ring 36, breaches 38 are provided, and ensure a fluid flow in the radial direction. The axial length of the bearing ring 36 projects beyond the axial length of the outer sealing lip 32 and the axial length of the inner sealing lip 34. The bearing ring 36 is arranged approximately halfway between the outer sealing lip 32 and inner sealing lip 34.

Between the outer sealing lip 32 and the bearing ring 36, and between the inner sealing lip 34 and the bearing ring 36, recesses which are open on one side, and contribute to the sealing effect of the sealing collar 30, are provided.

At the right-hand end shown in FIG. 1, the section which joins the outer sealing lip 32, the bearing ring 36 and the inner sealing lip 34 forms a sealing collar back 31. The sealing collar back 31 is in flat form in regions. In the region of the sealing surface which is brought into contact with the pressure piston 20, the sealing collar back 31 has a step. This step forms a circular sealing ring 37 (see also FIG. 3).

With reference to FIG. 3, on the sealing collar back 31 of the sealing collar 30 multiple knob-shaped spacer elements 39 are provided. The knob-shaped spacer elements 39 are arranged in the radially outer region of the back 31. In FIG. 3, it can also be seen that the knob-shaped spacer elements 39 are arranged in a circle at equal angular intervals on the sealing collar back 31 of the sealing collar 30. Between the spacer elements 39, intermediate spaces are provided, and ensure the non-sealing function of the collar back 31.

The sealing collar 30 according to the embodiment described here is produced from a spring-elastic material by an injection moulding method. A specially suitable material for use for the sealing collar 30 is, for instance, rubber. The spacer elements 39 are formed in one piece with the outer sealing lip 32, the axial projection 36, the inner sealing lip 34 and the sealing ring 37. The bearing ring 36 is formed integrally with the sealing element 30. Alternatively, it can be made of a material of higher strength than the material of which the outer sealing lip 32 and inner sealing lip 34 are formed, and be bonded to the sealing collar 30.

FIG. 1 shows the main brake cylinder 10 in an unpressurised state. In other words, the pressure in the pressure chamber 11 corresponds to the pressure in the pressurising medium channel 14 and intermediate space 16, which in turn equals the pressure in the pressurising medium reservoir. The overrun holes 22 connect the pressurising medium reservoir (not shown) fluidly to the pressure chamber 11.

The pressure in the pressure chamber 11 rises as soon as the overrun holes 22 of the pressure piston 20 are sealed by the inner sealing lip 34 of the sealing collar 30. The distance which the pressure piston 20 has traveled until this point is also called the "free travel" of the main brake cylinder 10, since fluid can be exchanged from the pressurising medium reservoir and pressure chamber 11, via the pressurising medium channel 14, intermediate space 16 and through the overrun holes 22. As soon as the overrun holes 22 are completely sealed by the inner sealing lip 34 and the pressure piston 20 is moved further to the left in FIG. 1, the pressure rises in the pressure chamber 11, and the effect of this pressure is that the wheel brakes of the motor vehicle are actuated via a hydraulic unit which is connected to the pressure chamber 11 of the main brake cylinder 10. Simultaneously, the effect of the increased pressure in the pressure chamber 11 is that the inner sealing lip 34, beyond the state which is caused by its inherent initial tension, is pressed even more strongly onto the outer surface of the pressure piston 20, and the outer sealing lip 32 is pressed even more strongly against the floor 13c of the ring-shaped groove 13, so that the pressure chamber 11 is reliably sealed against the reservoir 13 and pressure piston 20.

In the case of pressure buildup in the pressure chamber 11, the sealing collar 30 is pushed axially in the direction onto the wall 13b of the ring-shaped groove 13. The spacer elements 39 on the collar back 31 of the sealing collar 30 ensure that a distance d is maintained between the sealing ring 37 and the wall 13b of the ring-shaped groove 13 in the unpressurised state. However, with increasing pressure in the pressure chamber 11, the spacer elements 39 are compressed, since the sealing collar 30 is displaced because of pressure. The compression of the spacer elements 39 goes so far that finally the sealing ring 37 makes contact with the wall 13c, and takes over an additional sealing function.

Figure 2:
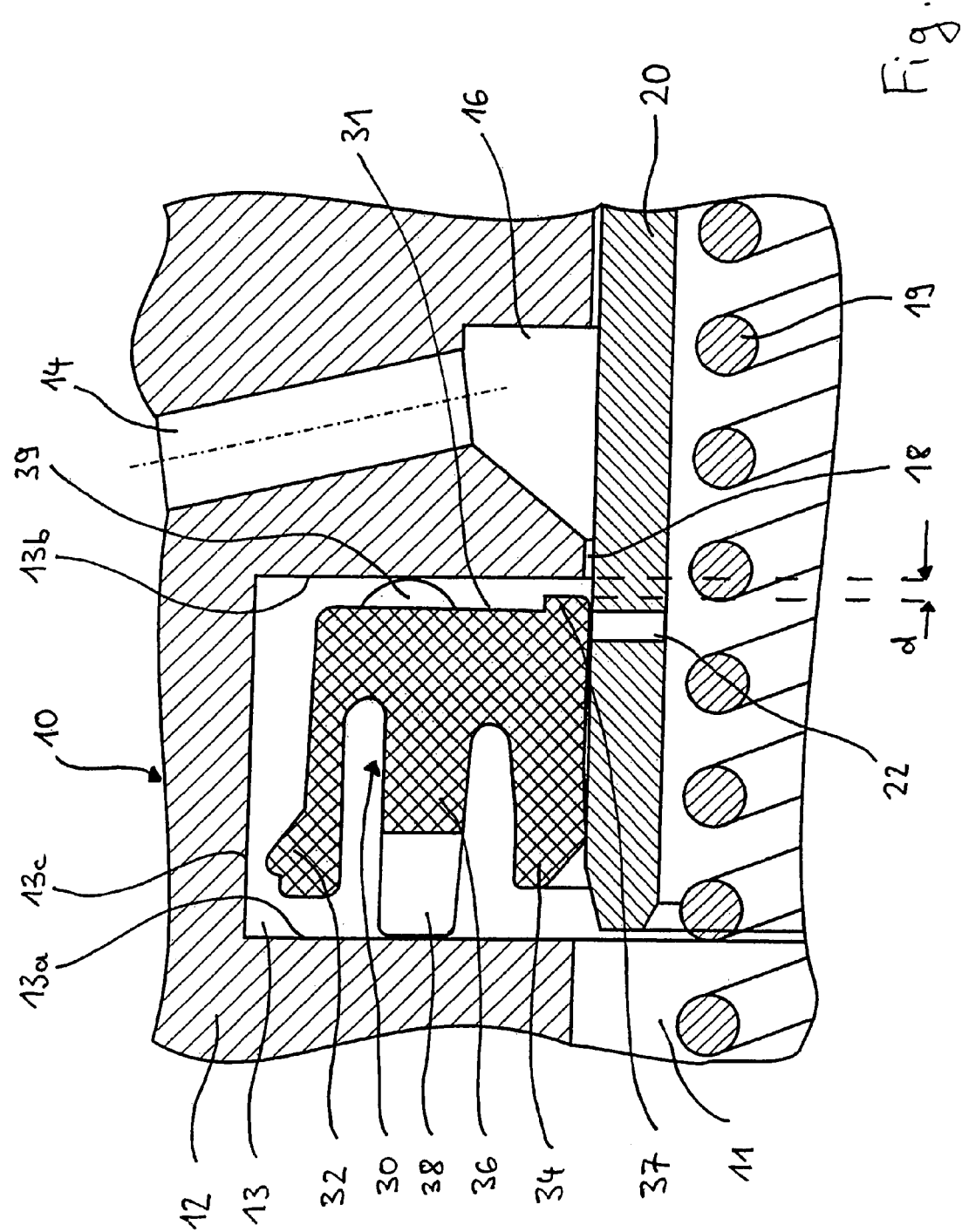
FIG. 2 shows an axial section through the brake cylinder shown in FIG. 1, the brake cylinder being in a non-equilibrium state.

If the driver of the motor vehicle now releases the brake, the result is a situation according to FIG. 2. Because of the return movement of the pressure piston 20, the volume of the pressure chamber 11 increases, so that the pressure in the pressure chamber 11 falls rapidly. Finally, an overpressure load from the pressure chamber 11 no longer acts on the sealing collar 30. If the brake pedal is released rapidly, the result in the pressure chamber 11 can be that a pressure below atmospheric pressure occurs. In this case, on the pressure collar a "pressure load reversal" occurs, and causes the outer sealing lip 32 to detach itself from the floor 13c of the ring-shaped groove 13. In this state, pressurising medium from the pressurising medium reservoir can reach the pressure chamber 11 through the pressurising medium channel 14, the intermediate area 16, the passage 18, the gap at the sealing ring 37, between the spacer elements 39 and past the outer sealing lip 32. Pressure is thus balanced between the pressurising medium reservoir and the pressure chamber 11.

In the case of the sealing collar described here, this pressure balancing occurs even if the pressure chamber 11 is still separated by the inner sealing lip 34 of the sealing collar 30 from its fluid reservoir, because pressurising medium can flow through the gap at 37, so that overflowing of the outer sealing lip 32 is ensured. The pressure balancing also occurs much earlier than would be the case if the sealing collar back 31 was in contact with the wall 13b of the ring-shaped groove 13, so that overflowing of the outer sealing lip 32 was still not possible at this time. Overflowing of the outer sealing lip 32 at this early time during the return movement of the pressure piston 20 is ensured by the spacer elements 39, since between the spacer elements 39 intermediate spaces through which the pressurising medium can flow are provided. This early pressure balancing prevents an excessive drop of the pressure in the pressure chamber 11 and an abrupt relief of the pressure when the overrun holes 22 in the pressure piston 20 are opened to the fluid reservoir.

If, in the course of time, the outer sealing lip 32 no longer ensures a sufficient sealing function, e.g. because of dirt particles in the pressurising medium, elastic deformation of the spacer knobs 39 allows the sealing ring 37 to be in contact with the wall 13b of the ring-shaped groove 13. The sealing ring 37 thus takes over the sealing function of the outer sealing lip 32, which is important particularly in the case of high pressures in the pressure chamber 11. In the case of undershooting of the pressure acting on the sealing collar 30, the energy which is stored during the elastic deformation ensures that the sealing ring 37 detaches itself again from the wall 13b, to restore the distance d between the sealing ring 37 and the wall 13b.

The spacer knobs 39 prevent the collar back 31 being sucked onto the wall 13b of the ring-shaped groove 13. Thus, on the return movement of the pressure piston 20, the pressurising medium can reach the pressure chamber 11 through the passage 18 and past the gap d on the outer sealing lip 32 much earlier, so that the pressure is balanced at a much earlier time than would be the case without spacer knobs 39 on the collar back 31. The pressure balancing is initiated at a much earlier time, so that an abrupt relief of the pressure in the pressure chamber 11, at the instant when the overrun holes 22 in the pressure piston 20 are released from the inner sealing lip 34 of the sealing collar 30, is avoided. In this way, the flow noises which occur when the brake is released rapidly are avoided.

The person skilled in the art recognises that the spacer knobs 39 can not only be arranged on the collar back 31 of the sealing collar 30 as in the embodiment described here. Instead, the spacer knobs 39 can also be arranged on the wall 13b of the ring-shaped groove 13. For instance, rubber segments can be inserted into radially running grooves in the side wall 13b of the ring-shaped groove 13; their height, measured from the surface of the wall 13b, should not project beyond the axial length of the sealing ring 37. These rubber segments should end directly above the sealing ring 37, to ensure the redundant sealing function of the sealing ring 37.

Furthermore, the spacer knobs 39 do not have to be arranged in a circle at equal angular intervals on the collar back 31, as shown here. Other arrangements of the spacer knobs 39 on the collar back 31 are possible, provided that they prevent the collar back being sucked onto the groove wall 13b as pressure builds up in the pressure chamber 11.

Furthermore, the person skilled in the art can see that the main brake cylinder 10, which is described here as an example, and the sealing collar 30 which is housed in the ring-shaped groove 13, ensure an ESP (electronic stabilisation programme) and/or ABS (anti-lock braking system) functionality of the main brake cylinder 10. For instance, in the case of an ESP intervention, it may be necessary to suck pressurising medium out of the pressurising medium reservoir, via the pressurising medium channel 14, the intermediate space 16, through the passage 18 and past the outer sealing lip 32 into the pressure chamber 11. This is preferably done by means of a pump, which is connected to the pressure chamber 11 of the main brake cylinder 10. For this purpose, the outer sealing lip 32 is overflowed by the outer sealing lip 32 folding in the direction of the inner sealing lip 34. The pressurising medium can flow through between the spacer knobs 39 and thus reach the pressure chamber 11.

In accordance with the provisions of the patent statutes, the principle and mode of operation of this invention have been explained and illustrated by its preferred embodiment. However, it must be understood that this invention may be practiced otherwise than as specifically explained and illustrated without departing from its spirit or scope.

What is claimed is:

1. A sealing element that is adapted to seal a pressure piston which is movably arranged in a housing of a brake cylinder, said sealing element adapted to be inserted into a ring-shaped groove which is provided in the housing, the sealing element comprising:
   an outer sealing lip that is adapted to contact a floor of a ring-shaped groove provided within a housing of a brake cylinder,
   an inner sealing lip that is adapted to contact a pressure piston which is movably arranged in the housing of the brake cylinder, and
   a sealing element back on which at least one non-sealing spacer element and a sealing ring are provided,
   wherein the spacer element projects beyond the sealing ring when the sealing element is in an unpressurized state, and wherein the spacer element does not project beyond the sealing ring when the sealing element is in a pressurized state.

2. The sealing element according to claim 1, wherein the spacer element is in raised form on the sealing element back.

3. The sealing element according to claim 1, wherein the spacer element is formed in one piece with the sealing element.

4. The sealing element according to claim 1, wherein the spacer element is in spring-elastic form.

5. The sealing element according to claim 1, wherein multiple spacer elements are provided, and are arranged at equal angular intervals from each other on the sealing element back.

6. The sealing element according to claim 5, wherein the multiple spacer elements are arranged in a circle on the sealing element back.

7. The sealing element according to claim 1, wherein between the outer sealing lip and the inner sealing lip, a bearing ring is arranged.

8. The sealing element according to claim 7, wherein the bearing ring projects beyond the outer sealing lip and inner sealing lip.

9. The sealing element according to claim 7, wherein at least one breach is provided on a free axial end of the bearing ring.

10. The sealing element according to claim 1, wherein the at least one non-sealing spacer element includes a plurality of knob-shaped spacer elements arranged in a circle on the sealing element back.

11. A brake cylinder comprising:
    at least one pressure piston which is movably arranged in a housing of the brake cylinder, and
    at least one sealing element which is provided in a ring-shaped groove of the housing, the sealing element having an outer sealing lip that contacts a floor of the ring-shaped groove, an inner sealing lip that contacts the pressure piston, and a sealing element back on which at least one non-sealing spacer element and a sealing ring are provided, wherein the spacer element projects beyond the sealing ring when the sealing element is in an unpressurized state, and wherein the spacer element does not project beyond the sealing ring when the sealing element is in a pressurized state.

12. The brake cylinder according to claim 11, wherein the spacer element is in raised form on the sealing element back.

13. The brake cylinder according to claim 11, wherein the spacer element is formed in one piece with the sealing element.

14. The brake cylinder according to claim 11, wherein the spacer element is in spring-elastic form.

15. The brake cylinder according to claim 11, wherein multiple spacer elements are provided, and are arranged at equal angular intervals from each other on the sealing element back.

16. The brake cylinder according to claim 15, wherein the multiple spacer elements are arranged in a circle on the sealing element back.

17. The brake cylinder according to claim 11, wherein between the outer sealing lip and the inner sealing lip, a bearing ring is arranged.

18. The brake cylinder according to claim 17, wherein the bearing ring projects beyond the outer sealing lip and inner sealing lip.

19. The brake cylinder according to claim 17, wherein at least one breach is provided on a free axial end of the bearing ring.

20. The brake cylinder according to claim 11, wherein the at least one non-sealing spacer element includes a plurality of knob-shaped spacer elements arranged in a circle on the sealing element back.

* * * * *